United States Patent
Ford et al.

(10) Patent No.: US 6,566,600 B1
(45) Date of Patent: May 20, 2003

(54) MULTIPLE GANG JUNCTION BOX ASSEMBLY WITH SEPARATE LOCKABLE DIVIDER PANELS

(75) Inventors: Gregory H. Ford, Reno, NV (US); Oliver H. Lieder, Carson City, NV (US)

(73) Assignee: OEM Systems Company, Inc., Saarks, NV (US)

( * ) Notice: Subject to any disclaimer, the term of this patent is extended or adjusted under 35 U.S.C. 154(b) by 0 days.

(21) Appl. No.: 10/151,684

(22) Filed: May 17, 2002

Related U.S. Application Data

(63) Continuation-in-part of application No. 09/824,118, filed on Apr. 2, 2001, now Pat. No. 6,395,981.

(51) Int. Cl.[7] .................................................. H05K 5/00
(52) U.S. Cl. ........................... 174/50; 174/50; 220/3.2; 220/3.3; 220/3.92; 220/3.94; 220/4.02
(58) Field of Search ..................... 174/50; 220/3.2, 220/3.3, 3.92, 3.94, 4.02

(56) References Cited

U.S. PATENT DOCUMENTS

| | | | | |
|---|---|---|---|---|
| 1,929,844 A | * | 10/1933 | Haas ........................... | 220/3.9 |
| 3,472,945 A | | 10/1969 | Trachtenberg ............... | 174/53 |
| 3,587,906 A | | 6/1971 | Pepe ........................... | 220/3.2 |
| 3,905,484 A | | 9/1975 | Dean et al. .................. | 211/184 |
| 4,455,449 A | | 6/1984 | Rendel ......................... | 174/53 |
| 4,873,600 A | * | 10/1989 | Vogele ......................... | 174/50 |
| 5,177,325 A | | 1/1993 | Giammanco .................. | 174/50 |
| 5,301,437 A | * | 4/1994 | Burke .......................... | 33/528 |
| 5,486,650 A | | 1/1996 | Yetter .......................... | 174/53 |
| 5,594,207 A | * | 1/1997 | Fabian et al. ................. | 174/53 |
| 5,866,845 A | * | 2/1999 | Markiewicz et al. .......... | 174/57 |
| 5,902,960 A | * | 5/1999 | Smith .......................... | 174/66 |
| 5,990,439 A | | 11/1999 | Pever .......................... | 218/156 |
| 5,995,380 A | * | 11/1999 | Maue et al. .................. | 174/254 |
| 6,005,190 A | * | 12/1999 | Stark et al. .................. | 174/66 |
| 6,091,023 A | | 7/2000 | O'Donnell .................... | 174/57 |

* cited by examiner

*Primary Examiner*—Dean A. Reichard
*Assistant Examiner*—Anton Harris
(74) *Attorney, Agent, or Firm*—Flanagan & Flanagan; John R. Flanagan

(57) ABSTRACT

A multiple gang junction box assembly includes a main box, divider panels, first and second pluralities of positioning elements for receiving and positioning the divider panels in an interior chamber of the main box so as to laterally space apart the divider panels in lockable positions therein and to partition the interior chamber into a plurality of side-by-side compartments, and a front cover plate for covering a front opening of the main box. The first plurality of positioning elements are disposed in the interior chamber on either a rear wall or top and bottom walls of the main box. The second plurality of positioning elements are disposed on upper and lower edges of the divider panels and on top and bottom walls of the main box and spaced forwardly from the first plurality of positioning elements.

11 Claims, 8 Drawing Sheets

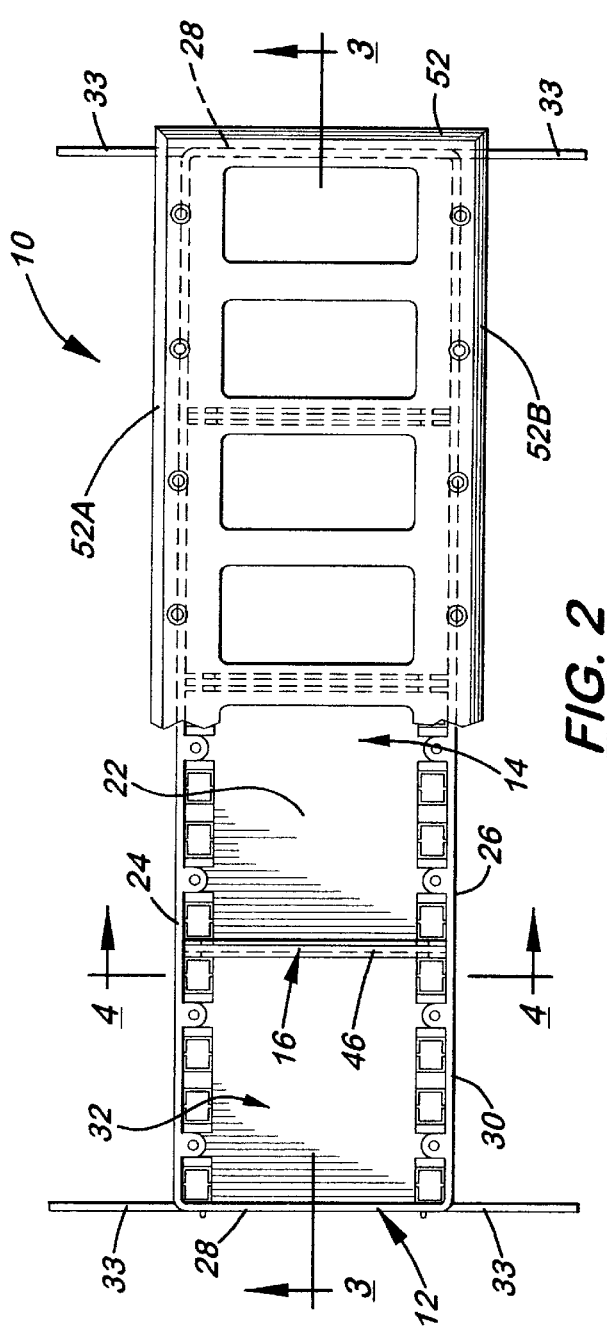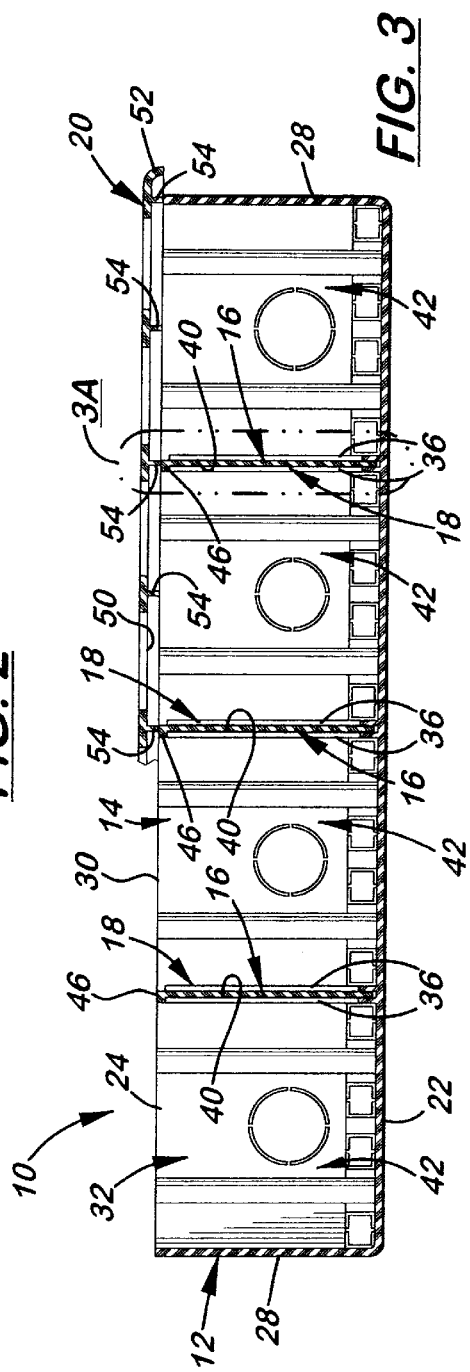

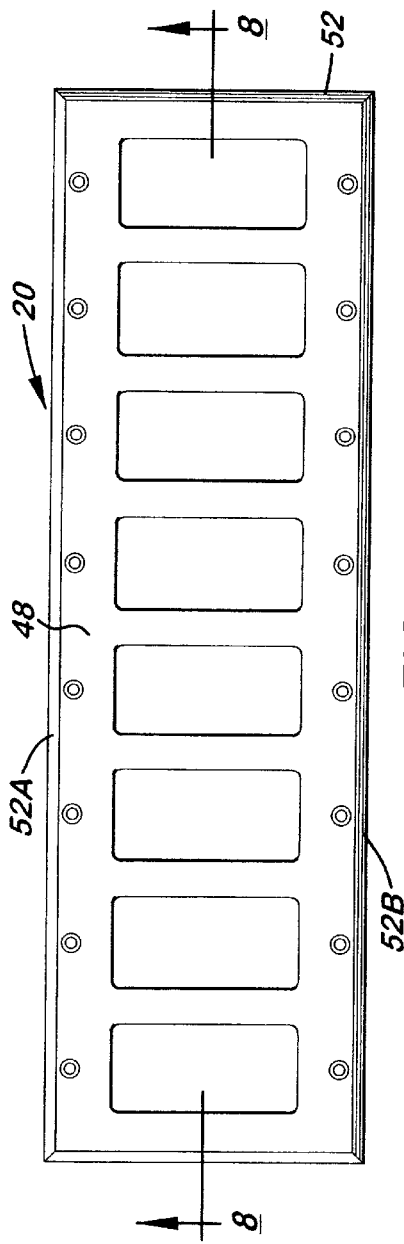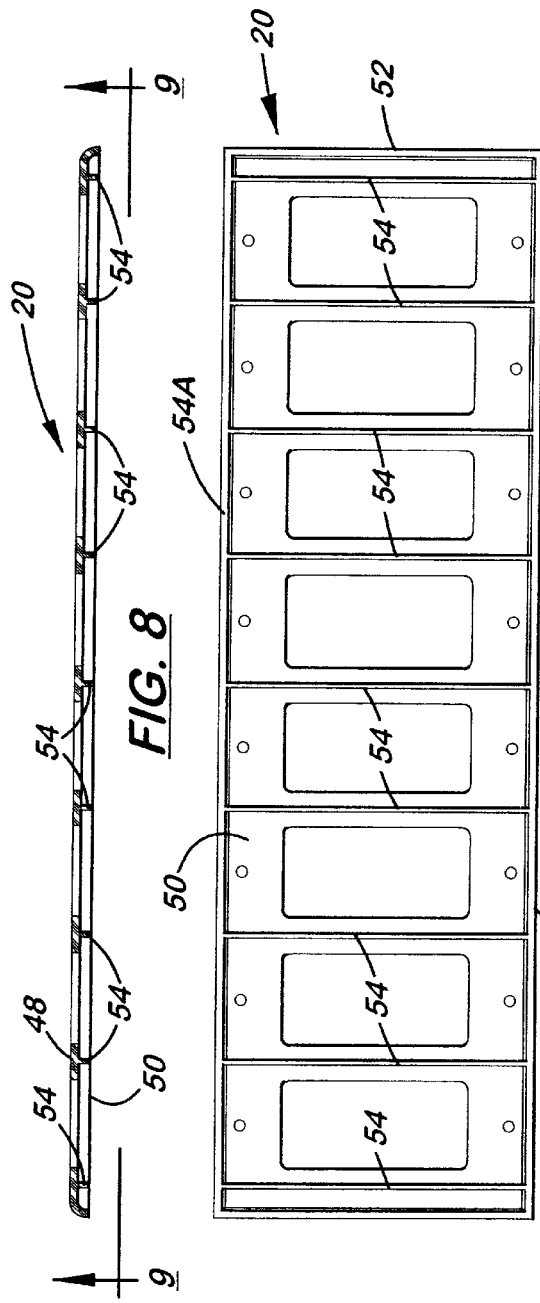
FIG. 7   FIG. 8   FIG. 9

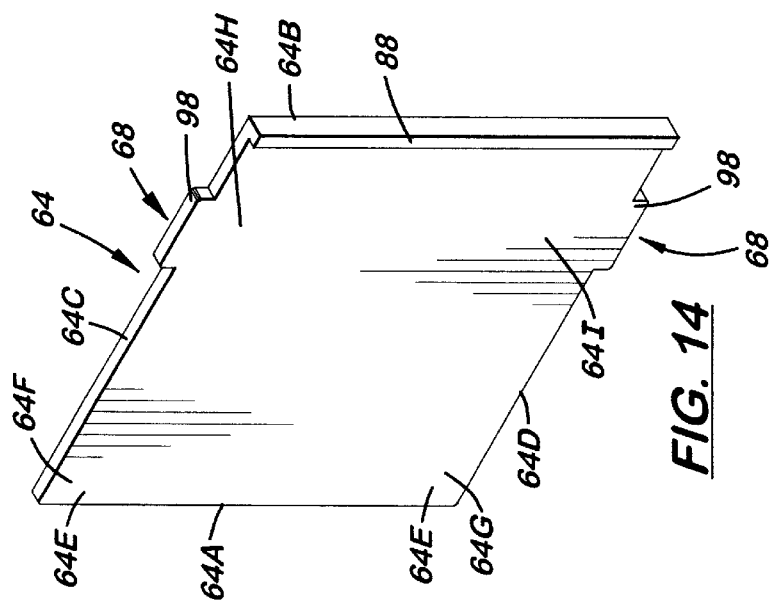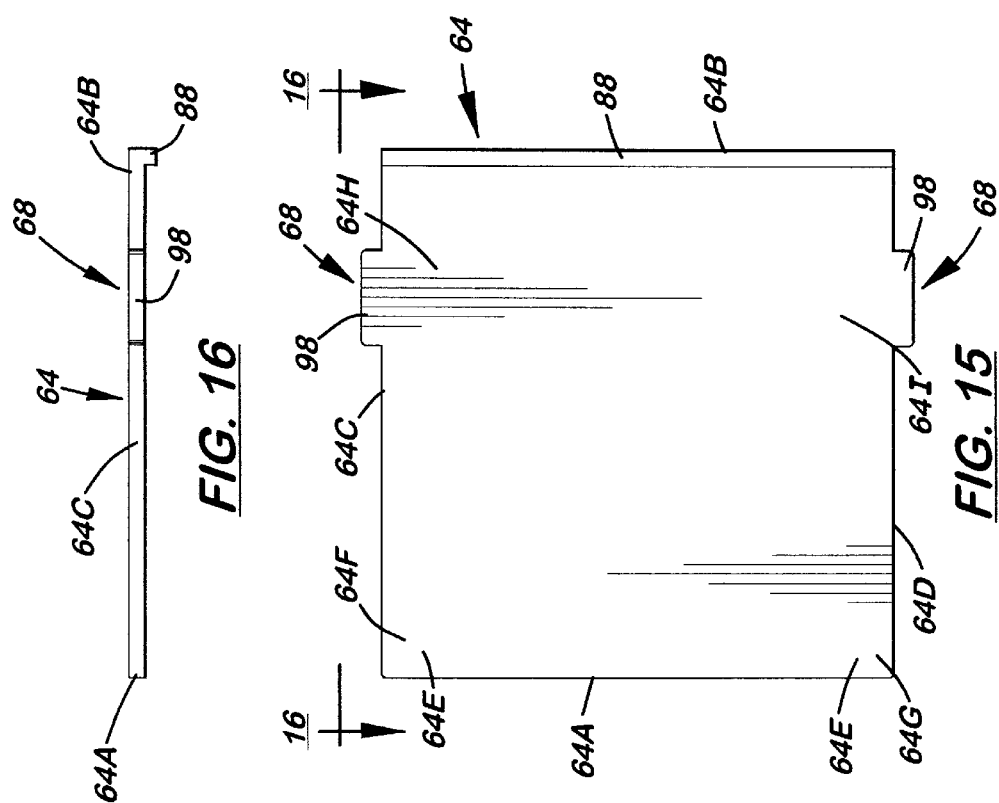

MULTIPLE GANG JUNCTION BOX ASSEMBLY WITH SEPARATE LOCKABLE DIVIDER PANELS

This patent application is a continuation-in-part of original U.S. application Ser. No. 09/824,118, filed Apr. 2, 2001 now U.S. Pat. No. 6,395,981.

BACKGROUND OF THE INVENTION

1. Field of the Invention

The present invention generally relates to multiple gang junction boxes and, more particularly, is concerned with a multiple gang junction box assembly with separate lockable divider panels.

2. Description of the Prior Art

Multiple gang junction boxes have long been well-known that generally include a front cover and a rectangular or any other desired shaped box having a rear wall and side walls at the top, bottom and opposite ends of the box which extend forwardly from the rear wall to form an open front which can be closed by the front cover. The rear wall and/or side walls are typically provided with preformed knockouts the removal of which provide openings in the box walls through which electrical wires can pass for connection to devices mounted in the box.

As is well known in the electrical field, Underwriter's Laboratory (UL) code requires that multiple gang junction boxes shall have therein suitable partitions dividing the box into separate compartments which will provide electrical arcing isolation therebetween where the box is to be utilized to house electric devices involving high and low voltage levels. Examples of prior art multiple gang junction boxes having partitioned compartments are the ones disclosed in U.S. Pat. No. 1,929,844 to Haas, U.S. Pat. No. 3,472,945 to Trachtenberg, U.S. Pat. No. 3,587,906 to Pepe, U.S. Pat. No. 4,455,449 to Rendel and U.S. Pat. No. 5,594,207 to Fabian et al.

Previous attempts to provide multiple gang junction boxes with suitable features that will satisfactorily divide the box into separate compartments so as to provide electrical arcing isolation between the compartments and thus meet the UL code requirements and still be economical and easy to manufacture have not been altogether successful. As a consequence, a need still remains for an innovation which will meet the electrical arcing isolation requirements and still be economical to manufacture.

SUMMARY OF THE INVENTION

The present invention provides a multiple gang junction box assembly designed to satisfy the aforementioned needs. The box assembly has a main box, a plurality of divider panels and a front cover plate which cooperate together to divide and separate an interior chamber of the main box into side-by-side compartments having enhanced electrical arcing isolation of the side-by-side compartments from one another.

Accordingly, the present invention is directed to a multiple gang junction box assembly which comprises: (a) a main box having rear, top, bottom and opposite side walls interconnected so as to form an interior chamber and a front peripheral edge defining a front opening to said interior chamber; (b) a plurality of divider panels separable from the main box, each of the divider panels having opposite rear and front edges and upper and lower edges which extend between the rear and front edges; (c) first and second pluralities of positioning elements for receiving and positioning the divider panels in the interior chamber so as to laterally space apart the divider panels from one another in lockable positions in the main box and to partition the interior chamber into a plurality of side-by-side compartments, the first plurality of positioning elements disposed in the interior chamber on either portions of the rear wall or portions of the top and bottom walls of the main box, the second plurality of positioning elements disposed on portions of the upper and lower edges of the divider panels and on portions of the top and bottom walls of the main box and spaced forwardly from the first plurality of positioning elements; and (d) a front cover plate separable from the main box and divider panels, the front cover plate having opposite front and rear sides and attachable to the main box such that the rear side of the front cover plate covers the front opening of the main box and portions of the rear side of the front cover plate are capable of making flush contact with the front edges of the divider panels so as to close off the side-by-side compartments from one another at the front edges of the divider panels when the divider panels are in the locked positions in the main box.

More particularly, the first plurality of positioning elements includes laterally spaced apart sets of upper and lower pairs of spaced apart ledges attached on and extending along the portions of the rear wall or the portions of the top and bottom walls of the main box and toward and ending at a location spaced rearwardly from the front peripheral edge of the main box such that upper and lower pairs of ledges of each set define channels therebetween being aligned with one another so as to removably receive in the aligned channels segments of the rear edge or segments of the upper and lower edges of one of the divider panels when the divider panel is installed in a locked position in the main box.

The second plurality of positioning elements includes a plurality of spaced apart pairs of slots defined in portions of the top and bottom walls of the main box such that each of the pairs of slots is spaced forwardly from and aligned with a respective one set of the first positioning elements. The second plurality of positioning elements also includes a plurality of pairs of lock tabs. Each of the pairs of lock tabs is respectively defined on and protrudes in opposite directions from portions of the upper and lower edges of one of the divider panels and is spaced from the opposite rear and front edges of the divider panel such that the lock tabs of the one divider panel insert into the one of the pairs of slots on the portions of the top and bottom walls of the main box when the divider panel is installed in the locked position in the main box.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 2 is a front elevational view of the assembly of FIG. 1 with all the divider panels installed in the main box.

FIG. 3 is a longitudinal sectional view of the assembly taken along line 3—3 of FIG. 2.

FIG. 7 is a front elevational view of the front cover plate of the assembly of FIG. 1.

FIG. 8 is a longitudinal sectional view of the front cover plate taken along line 8—8 of FIG. 7.

FIG. 9 is a rear elevational view of the front cover plate of the assembly as seen along line 9—9 of FIG. 8.

FIG. 14 is an enlarged perspective view of the divider panel of FIG. 12.

FIG. 15 is a side elevational view of the divider panel of FIG. 14.

FIG. 16 is a top plan view of the divider panel as seen along line 16—16 of FIG. 15.

DETAILED DESCRIPTION OF THE INVENTION

Figure 1:
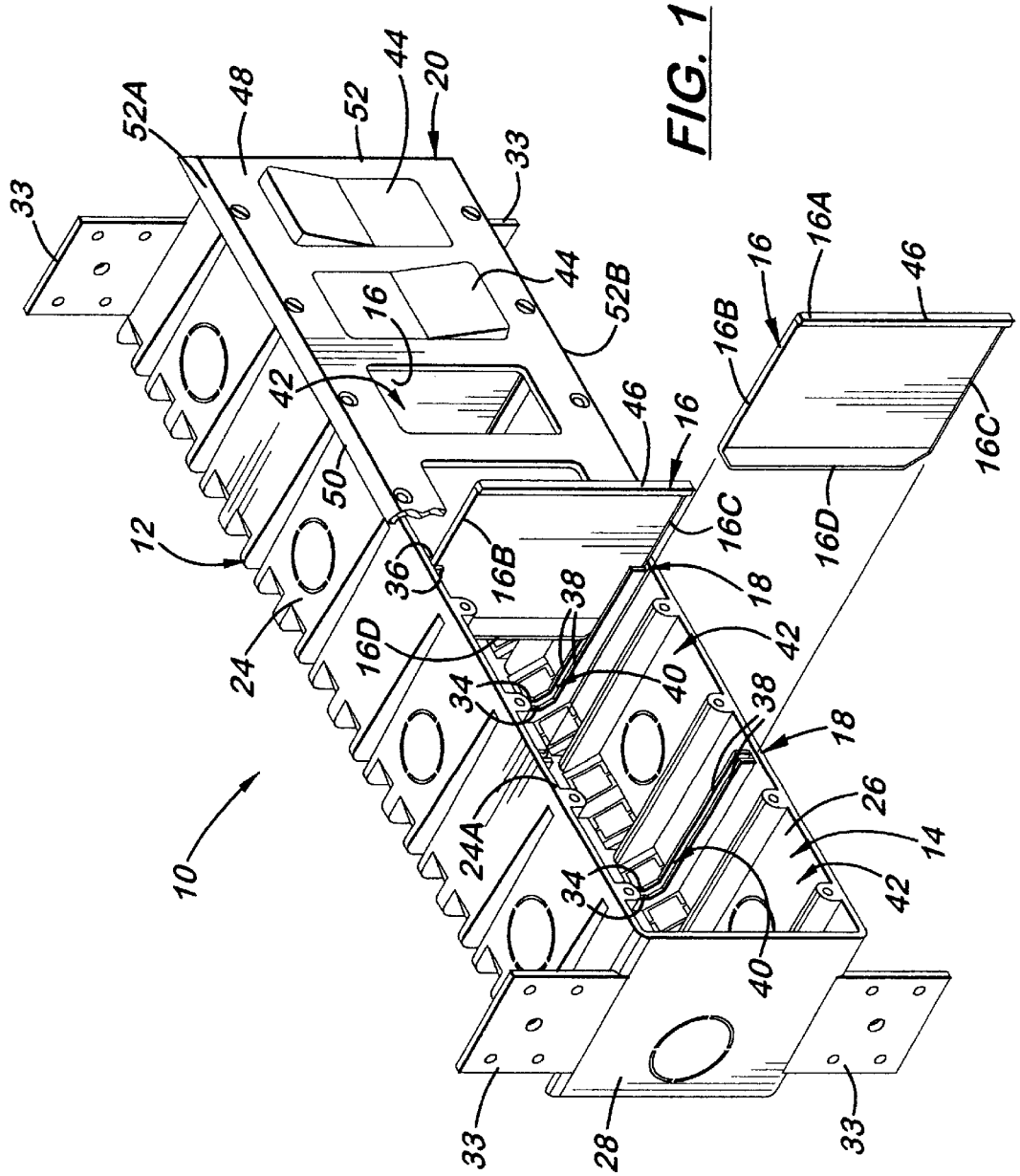
FIG. 1 is a front perspective view of a first embodiment of a multi-gang box assembly constituting the invention of the above-cited original patent application showing a portion of a front cover plate broken away to expose an interior chamber of a main box and showing two of a plurality of divider panels for providing partitions between side-by-side compartments in the interior chamber of the main box being respectively partially and fully slidably removed from the main box.
Figure 3A:
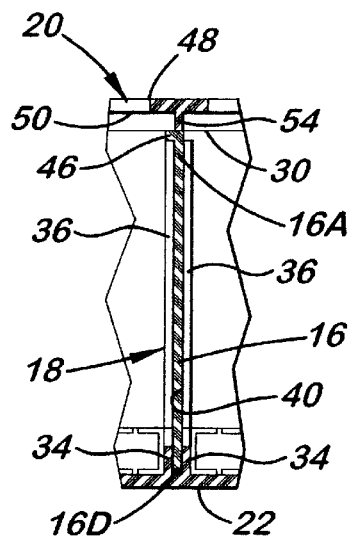
FIG. 3A is an enlarged fragmentary detailed view of the portion of the assembly of FIG. 3 enclosed by oval 3A.
Figure 4:
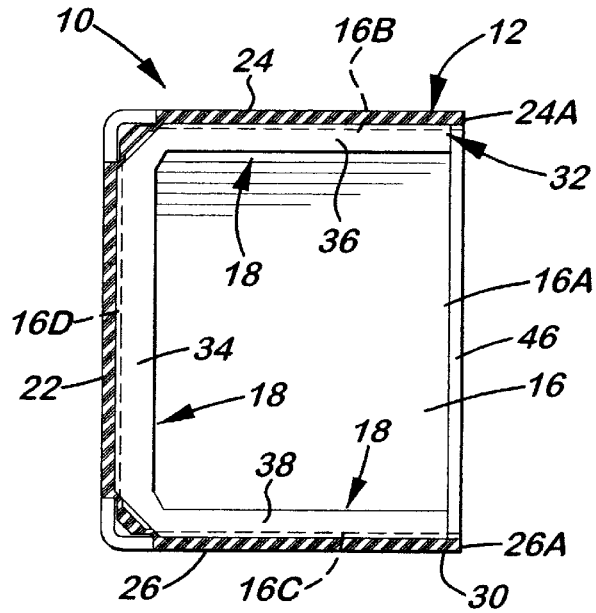
FIG. 4 is an enlarged cross-sectional view of the assembly taken along line 4—4 of FIG. 3 showing one of the divider panels installed in the interior chamber of the main box.
Figure 5:
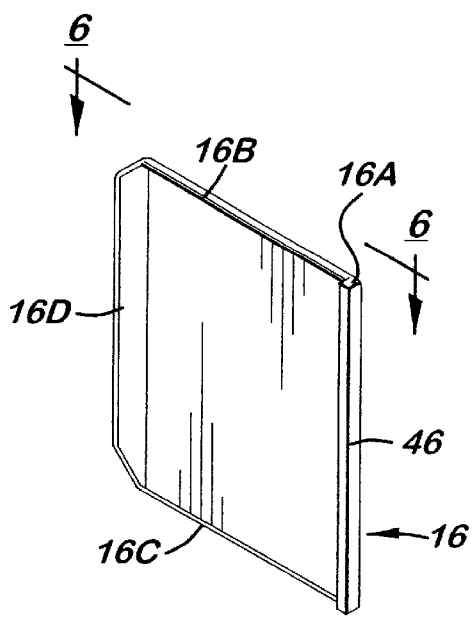
FIG. 5 is an enlarged perspective view of the one removed divider panel of FIG. 1.
Figure 6:
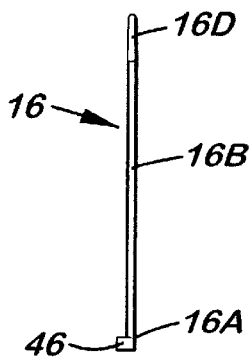
FIG. 6 is a top plan view of the divider panel as seen along line 6—6 of FIG. 5.
Figure 10:
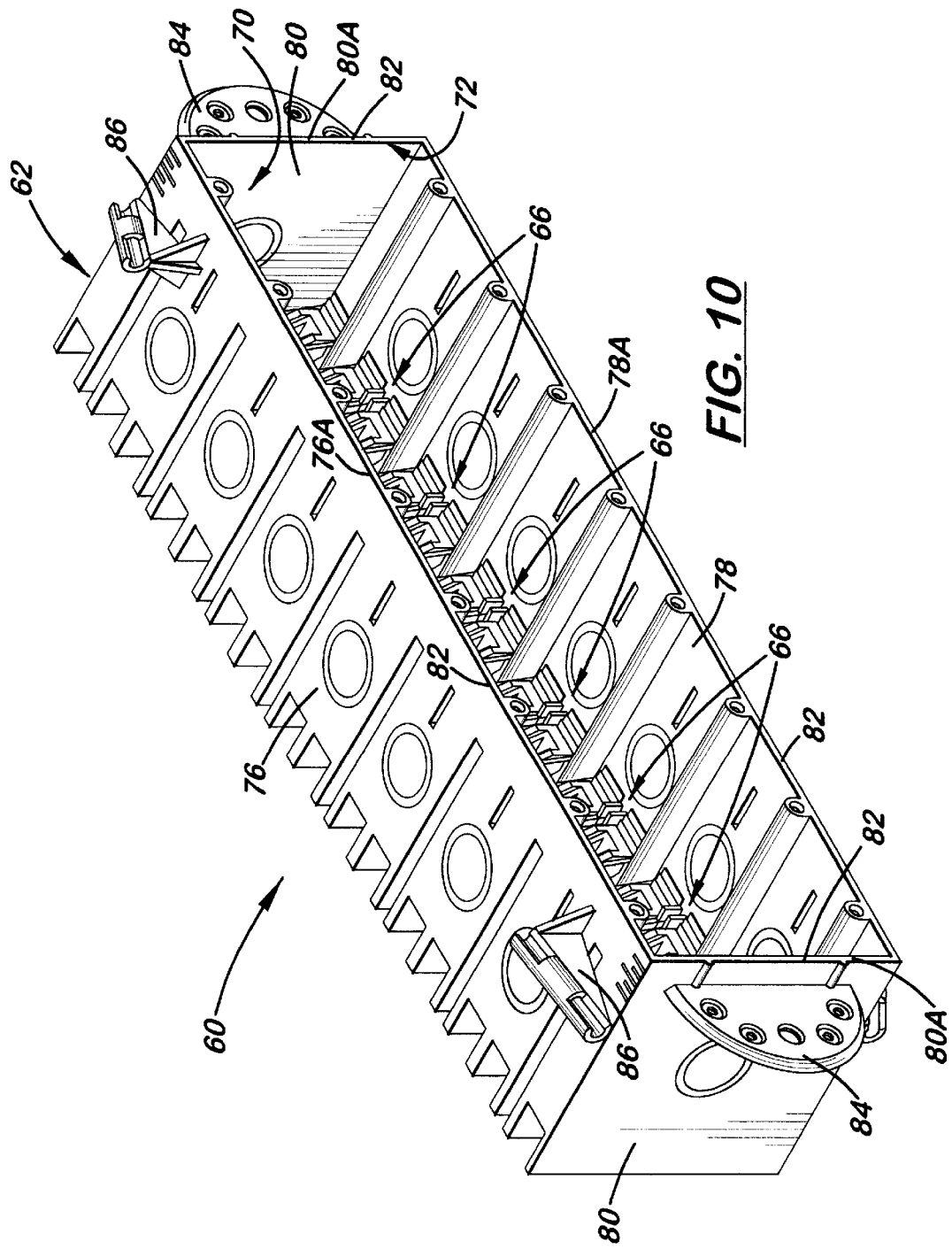
FIG. 10 is a front perspective view of a main box of a second embodiment of a multi-gang box assembly constituting the present invention.
Figure 11:
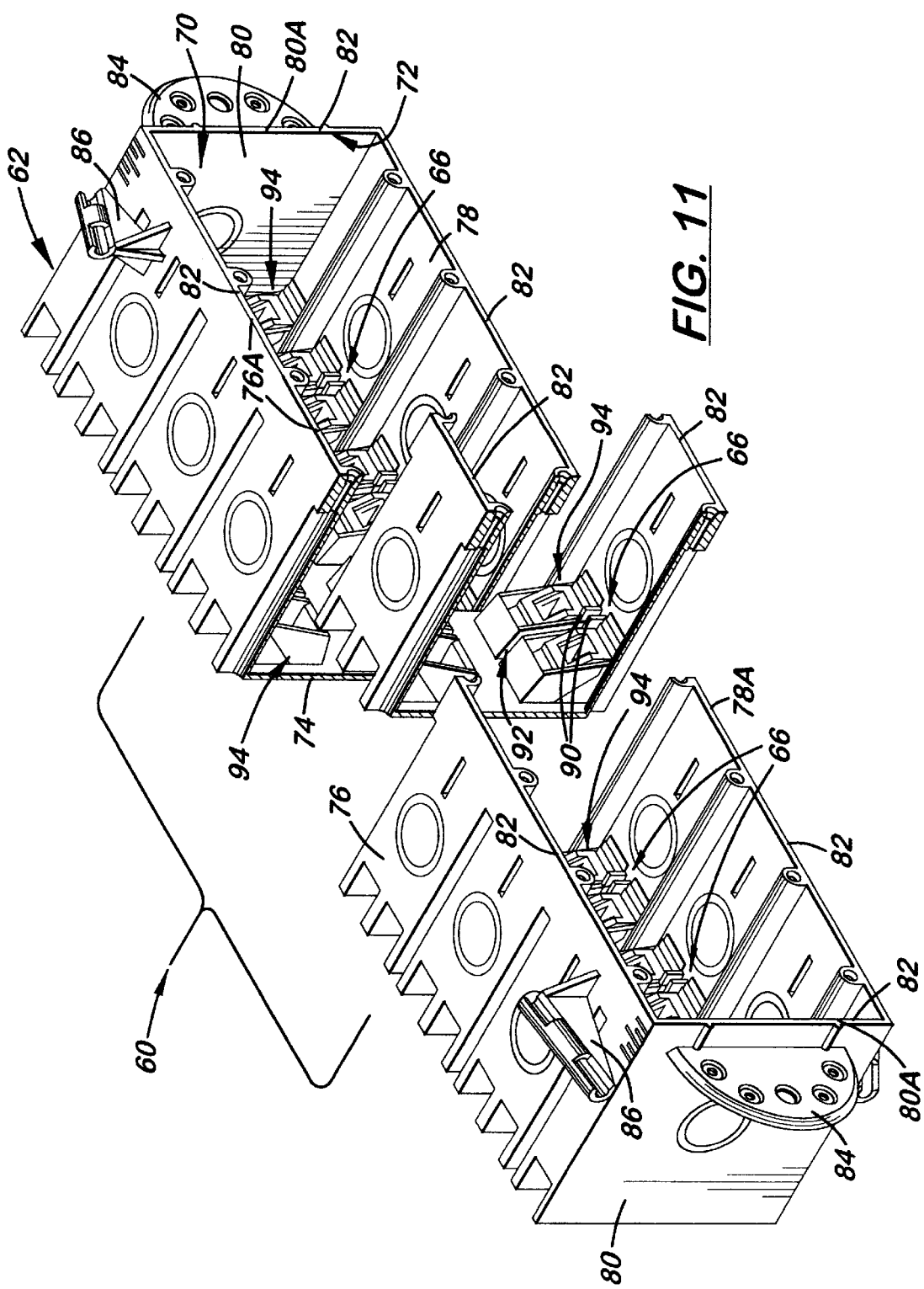
FIG. 11 is a front perspective view similar to that of FIG. 10 but showing the main box with a central section thereof broken out to better expose elements of the present invention.
Figure 12:
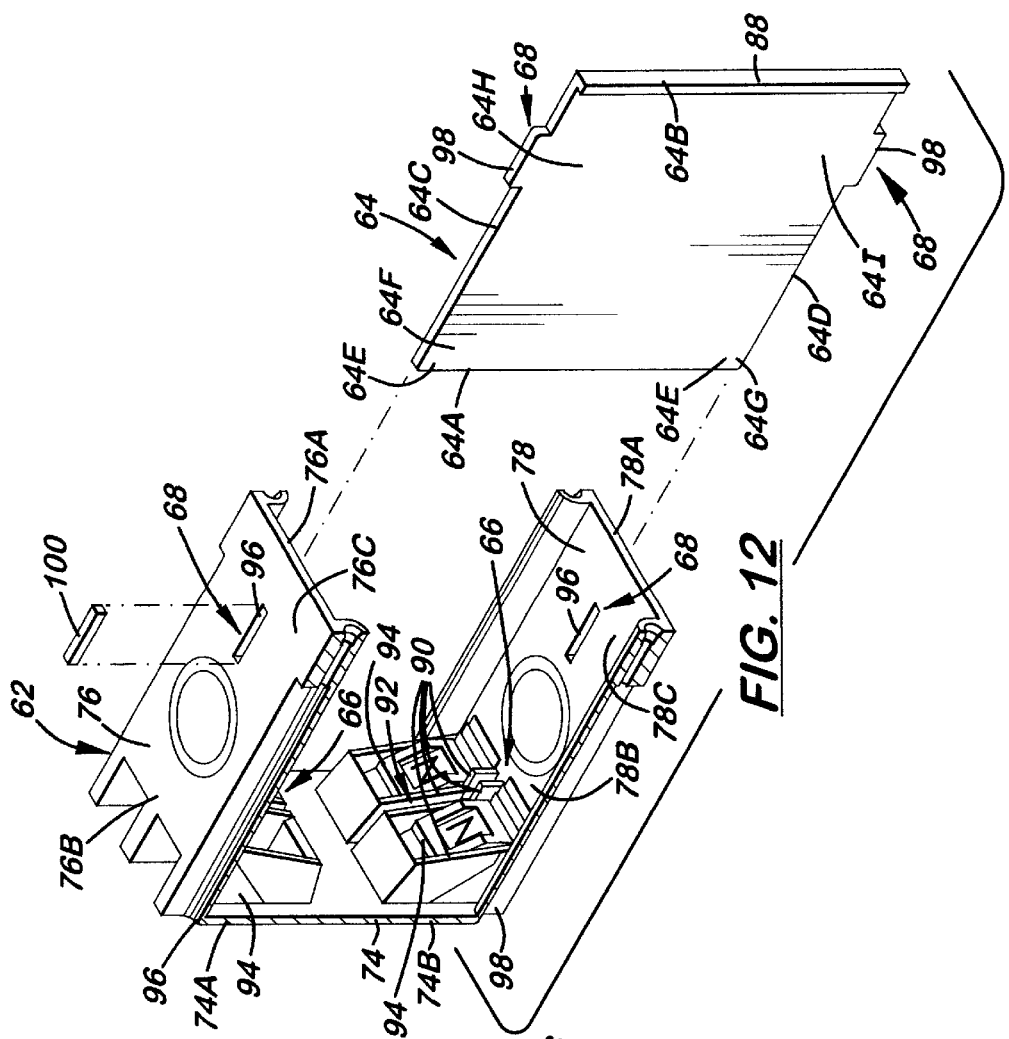
FIG. 12 is an enlarged perspective view of the broken out central section of the main box of FIG. 11 with one divider panel of the assembly shown removed from the main box.

Referring to the drawings and particularly to FIGS. 1 to 3, there is illustrated a first embodiment of a multiple gang junction box assembly, generally designated 10, constituting the invention of the above-cited original application. The assembly 10 basically includes a main box 12 having an interior chamber 14, a plurality of divider panels 16 separable from the main box 12, a plurality of positioning elements 18 attached to the main box 12 in the interior chamber 14 for slidably receiving and positioning the divider panels 16 in the interior chamber 14, and a front cover plate 20 separable from the main box 12 and divider panels 14. As an example, the main box 12, divider panels 16, positioning elements 18 and front cover plate 20 can be made of a conventional plastic material and manufactured by conventional injection molding techniques. While the main box 12 can have any desired size, one example is a length of fourteen and one-half inches so that the main box 12 can be fitted between two sixteen-inch on-center studs (not shown).

More particularly, the main box 12 of the assembly 10 includes a rear wall 22, a top wall 24, a bottom wall 26 and a pair of opposite side walls 28. The rear, top, bottom and side walls 22, 24, 26, 28 are integrally interconnected so as to form the interior chamber 14 of the box 12 and provide the box 12 with a generally rectangular configuration. The top, bottom and opposite side walls 24, 26, 28 have respective forward edge portions 24A, 26A, 28A which together form a front peripheral edge 30 of the main box 12 defining a front opening 32 to the interior chamber 14. Tabs 33 integrally attached to and extending above and below side walls 28 can be employed to secure the main box 12 to the studs.

The plurality of positioning elements 18 preferably are in the form of a plurality of laterally spaced apart sets of pairs of spaced apart rear, top and bottom ledges 34, 36, 38 integrally attached on and extending along the interiors of the rear, top and bottom walls 22, 24, 26 of the main box 12 between the rear wall 22 and the front peripheral edge 30 thereof. The pairs of spaced apart rear, top and bottom ledges 34, 36, 38 are attached one pair to the next and extend into the interior chamber 14. Also, the pairs of spaced apart rear, top and bottom ledges 34, 36, 38 of each set are aligned with one another and together define a C-shaped channel 40 therebetween located in the interior chamber 14 which slidably receives and positions one of the divider panels 16 in the interior chamber 14 so as to laterally space apart the divider panels 16 from one another through a given displacement "a". The divider panels 16 and ledges 34, 36, 38 solidly partition the interior chamber 14 into a plurality of side-by-side compartments 42 provided in a condition of electrical arcing isolation from one another. The isolated compartments 42 allow low electrical voltage components, such as light switches and volume controls 44, and high electrical voltage (110 VAC) components (not shown) to be housed in the adjacent compartments 42.

Each of the divider panels 16 of the assembly 10 has a front edge portion 16A thereon. Each of the divider panels 16 further has a top edge portion 16B, a bottom edge portion 16C and a rear edge portion 16D which preferably are thinner than the remainder of the divider panel 16 to facilitate insertion of the divider panel 16 into the channel 40. The front edge portion 16A of each divider panel 16 preferably has a front flange 46 formed thereon which extends transversely in relation to the remainder of the divider panel 16 and has a width greater than the thickness of the divider panel 16. The front flange 46 of each divider panel 16 extends in one direction, and transversely, in relation to the remainder of the divider panel 16 and has a width greater than the thickness of the divider panel 16.

The front cover plate 20 of the assembly 10 has opposite front and rear sides 48, 50, a peripheral edge 52 and a plurality of vertical lands 54 formed on and protruding from the rear side 50 of the front cover plate 20. The vertical lands 54 are laterally spaced apart from one another by a given distance "b". The given displacement "a" of the divider panels 16 from one another in the interior chamber 14 is substantially equal to a predetermined number of times the given distance "b" of the vertical lands 54 from one another. The given displacement "a" of the divider panels 16 from one another is preferably substantially equal to two times the given distance "b" of the vertical lands 54 from one another. The vertical lands 54 also extend between and interconnect top and bottom portions 52A, 522 of the peripheral edge 52 of the front cover plate 20. When the front cover plate 20 is positioned adjacent to the front peripheral edge 30 of the main box 12 and attached to the main box 12 using any suitable known technique so as to cover the front opening 32 thereof, flat surfaces 54A of some of the vertical lands 54 of the front cover plate 20, such as every other land 54, and flat surfaces 46A of the front flanges 46 of the divider panels 16 are placed in flush contact with one another. Such flush contact between the flat surfaces 54A, 46A closes off adjacent ones of the side-by-side compartments 42 from one another at the front flanges 46 of the divider panels 16 and thereby provides additional electrical arcing isolation of the side-by-side compartments 42 from one another. The width of the front flange 46 of each of the divider panels 16 also is greater than the width of the one of the vertical lands 54 of the front cover plate 20 such that the land 54 can be somewhat misaligned with the divider panel 16 in the lengthwise direction of the main box 12 and still be in flush contact with the front flange 46 on the respective divider panel 16. This width difference between the front flanges 46 and lands 54 accommodates component tolerance and mounting variations.

Figure 13:
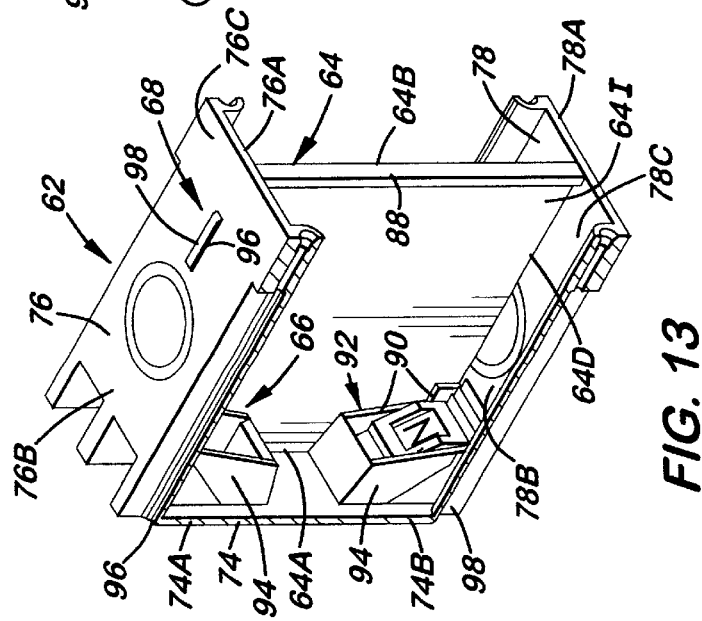
FIG. 13 is an enlarged perspective view of the broken out central section of the main box of FIG. 11 with the one divider panel of the assembly installed and locked in place in the main box.

Referring now to FIGS. 10–16, there is illustrated a second embodiment of a multiple gang junction box assembly, generally designated 60, constituting the present invention. The assembly 60 basically includes a main box 62, a plurality of divider panels 64 (only one of which being shown in FIGS. 12–16), first and second pluralities of positioning elements 66, 68 for receiving and positioning the divider panels 64 in an interior chamber 70 of the main box 62 so as to laterally space apart the divider panels 64 in lockable positions (as seen in FIG. 13) in the main box 62 and to partition the interior chamber 70 into a plurality of side-by-side compartments, and a front cover plate 20 (being identical to the front cover plate of the first embodiment and thus identified by the same reference numeral) for covering a front opening 72 of the main box 62. As an example, the main box 62, divider panels 64 and front cover plate 20 can be made of a conventional plastic material and manufactured by conventional injection molding techniques. While the main box 62 can have any desired size, one example is a length of fourteen and one-half inches so that the main box 62 can be fitted between two sixteen-inch on-center studs (not shown).

More particularly, similar to the main box 12 of the assembly 10, the main box 62 of the assembly 60 includes a rear wall 74, atop wall 76, a bottom wall 78 and a pair of opposite side walls 80. The rear, top, bottom and opposite side walls 74, 76, 78, 80 are integrally interconnected so as to form the interior chamber 70 and provide the main box 12 with a generally rectangular configuration. The top, bottom and opposite side walls 76, 78, 80 have respective forward edges 76A, 78A, 80A which together form a front peripheral edge 82 of the main box 62 defining the front opening 72 to the interior chamber 70. The front peripheral edge 82 of the main box 62 is thus spaced forwardly from the rear wall 74 of the main box 62 and in an opposing relationship thereto. Brackets 84, 86 integrally attached to and extending from the top wall 76 and opposite side walls 80 can be employed to secure the main box 62 to the studs.

The plurality of divider panels 64 of the assembly 60 being separable from the main box 62 are insertable into and removable from the interior chamber 70 of the main box 62 through the front opening 72 thereof. Each divider panel 64 has opposite rear and front edges 64A, 64B and upper and lower edges 64C, 64D which extend between the rear and front edges 64A, 64B. The divider panels 64 of the assembly 60 are generally similar to the divider panels 16 of the assembly 10 except for the presence of parts of the second plurality of positioning elements 68 on the divider panels 64. The front cover plate 20, as employed in the assembly 60, is separable from the main box 62 and the divider panels 64, has the opposite front and rear sides 48, 50 and is attachable to the main box 64 such that the rear side 50 of the front cover plate 20 covers the front opening 72 of the main box 62 and vertical lands 54 formed on and protruding from the rear side 50 of the front cover plate 20 are capable of making flush contact with front flanges 88 on the front edges 64B of the divider panels 64, the same as shown in FIG. 3 and earlier described in the case of the assembly 10, so as to close off the side-by-side compartments from one another at the front edges 64B of the divider panels 64 when the divider panels 64 are in the locked positions in the main box 62.

The first plurality of positioning elements 66 of the assembly 60 are disposed in the interior chamber 70 on either or both of upper and lower portions 74A, 74B of the rear wall 74 and rear portions 76B, 78B of the top and bottom walls 76, 78 of the main box 62 adjacent to the rear wall 74 thereof. More particularly, the first plurality of positioning elements 66 includes laterally spaced apart sets of upper and lower pairs of spaced apart ledges 90 attached on and extending along either or both of the upper and lower portions 74A, 74B of the rear wall 74 and rear portions 76B, 78B of the top and bottom walls 76, 78 of the main box 62 adjacent to the rear wall 74 thereof. The ledges 90 project into the interior chamber 70, extending toward and ending at a location spaced rearwardly from the front peripheral edge 72 of the main box 62, such that the upper and lower pairs of ledges 90 of each set thereof define guide channels 92 therebetween being aligned with one another so as to removably receive in the aligned guide channels either or both of segments 64E of the rear edge 64A and segments 64F, 64G of the upper and lower edges 64C, 64D of one of the divider panels 64 when the divider panel 64 is installed in the locked position in the main box 62, as seen in FIG. 13.

The guide ledges 90 are formed by spaced apart facing sides of upper and lower pairs of wire clamping devices 94 disposed in the interior chamber 70 and integrally attached on and protruding forwardly from upper and lower rear corners 96, 98 of the main box 62 formed by upper and lower portions 74A, 74B of the rear wall 74 and rear portions 76B, 78B of the top and bottom walls 76, 78 of the main box 62. These wire clamping devices 94 constitute the invention of a copending patent application assigned to the same assignee as the present invention.

The second plurality of positioning elements 68 of the assembly 60 are disposed on intermediate portions 64H, 64I of the upper and lower edges 64C, 64D of the divider panels 64 and on intermediate portions 76C, 78C of the top and bottom walls 76, 78 of the main box 62 and spaced forwardly from the first plurality of positioning elements 66. More particularly, the second plurality of positioning elements 68 includes a plurality of spaced apart pairs of slots 96 and a plurality of pairs of lock tabs 98. Each of the pairs of slots 96 are defined in the intermediate portions 76C, 78C of the top and bottom walls 76, 78 of the main box 62 such that each of the pairs of slots 96 is spaced forwardly from and aligned with the guide channels 92 between the upper and lower pairs of ledges 90 of a respective one set of the first positioning elements 66. Each of the slots 96 is spaced from the rear wall 74 and the front peripheral edge 82 of the main box 52 but located closer to the front peripheral edge 82 of the main box 62 than to the rear wall 74 thereof. The slots 96 are substantially covered by breakaway tabs 100 detachably attached to the intermediate portions 76C, 78C of the respective top and bottom walls 76, 78 of the main box 62 and are capable of detachment therefrom prior to insertion of the respective divider panels 64 in the interior chamber 70 of the main box 62. Each of the pairs of lock tabs 98 are defined on and protrude in opposite directions from the intermediate portions 64H, 64I of the upper and lower edges 64C, 64D of one of the divider panels 64 and are spaced from the opposite rear and front edges 64A, 64B of the divider panel 64 such that the lock tabs 98 of the one divider panel 64 insert into the one of the pairs of slots 96 on the top and bottom walls 76, 78 of the main box 62 when the divider panel 64 is installed in the locked position in the main box 62, as seen in FIG. 13. Each of the pairs of lock tabs 98 is located closer to the front edge 64B of the one of the divider panels 64 than to the rear edge 64A thereof. The top and bottom walls 76, 78 of the main box 62 are sufficiently bendable or flexible so as to allow insertion and removal of the divider panels 64 to and from the locked position in the interior chamber 70 of the main box 62.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

We claim:

1. A multiple gang junction box assembly, comprising:
   (a) a main box having rear, top, bottom and opposite side walls interconnected so as to form an interior chamber in said main box, said top, bottom and opposite side walls of said main box forming a front peripheral edge on said main box defining a front opening to said interior chamber which is spaced forwardly from and in opposing relationship to said rear wall of said main box;
   (b) a plurality of divider panels insertable into and removable from said interior chamber of said main box through said front opening thereof and being separable from said main box, each of said divider panels having opposite rear and front edges and upper and lower edges which extend between said rear and front edges;
   (c) first and second pluralities of positioning elements for receiving and positioning said divider panels in said interior chamber so as to laterally space apart said divider panels from one another in lockable positions in said main box and to partition said interior chamber into a plurality of side-by-side compartments, said first plurality of positioning elements disposed in said interior chamber on either portions of said rear wall or portions of said top and bottom walls of said main box adjacent to said rear wall thereof, said second plurality of positioning elements disposed on portions of said upper and lower edges of said divider panels being spaced from said front and rear edges of said divider panels and on portions of said top and bottom walls of said main box and being spaced from said rear wall and said front peripheral edge of said main box and forwardly from said first plurality of positioning elements; and
   (d) a front cover plate separable from said main box and said divider panels, said front cover plate having opposite front and rear sides and attachable to said main box such that said rear side of said front cover plate covers said front opening of said main box and portions of the rear side of the front cover plate are capable of making flush contact with the front edges of the divider panels so as to close off said side-by-side compartments from one another at said front edges of said divider panels when said divider panels are in said locked positions in said main box.

2. A multiple gang junction box assembly, comprising:
   (a) a main box having rear, top, bottom and opposite side walls interconnected so as to form an interior chamber in said main box, said top, bottom and opposite side walls of said main box forming a front peripheral edge on said main box defining a front opening to said interior chamber which is spaced forwardly from and in opposing relationship to said rear wall of said main box;
   (b) a plurality of divider panels insertable into and removable from said interior chamber of said main box through said front opening thereof and being separable from said main box, each of said divider panels having opposite rear and front edges and upper and lower edges which extend between said rear and front edges;
   (c) first and second pluralities of positioning elements for receiving and positioning said divider panels in said interior chamber so as to laterally space apart said divider panels from one another in lockable positions in said main box and to partition said interior chamber into a plurality of side-by-side compartments, said first plurality of positioning elements disposed in said interior chamber on either portions of said rear wall or portions of said top and bottom walls of said main box adjacent to said rear wall thereof, said second plurality of positioning elements disposed on portions of said upper and lower edges of said divider panels being spaced from said front and rear edges of said divider panels and on portions of said top and bottom walls of said main box and being spaced from said rear wall and said front peripheral edge of said main box and forwardly from said first plurality of positioning elements, said first plurality of positioning elements including laterally spaced apart sets of upper and lower pairs of spaced apart ledges attached on and extending along portions of said rear wall or portions of said top and bottom walls of said main box adjacent to said rear wall thereof and projecting into said interior chamber of said main box and extending toward and ending at a location spaced rearwardly from said front peripheral edge of said main box such that upper and lower pairs of ledges of each set define channels therebetween being aligned with one another so as to removably receive in said aligned channels segments of said rear edge or segments of said upper and lower edges of one of said divider panels when said divider panel is installed in a locked position in said main box; and (d) a front cover plate separable from said main box and said divider panels, said front cover plate having opposite front and rear sides and attachable to said main box such that said rear side of said front cover plate covers said front opening of said main box and portions of the rear side of the front cover plate are capable of making flush contact with the front edges of the divider panels so as to close off said side-by-side compartments from one another at said front edges of said divider panels when said divider panels are in said locked positions in said main box.

3. A multiple gang junction box assembly, comprising:

(a) a main box having rear, top, bottom and opposite side walls interconnected so as to form an interior chamber in said main box, said top, bottom and opposite side walls of said main box forming a front peripheral edge on said main box defining a front opening to said interior chamber which is spaced forwardly from and in opposing relationship to said rear wall of said main box;

(b) a plurality of divider panels insertable into and removable from said interior chamber of said main box through said front opening thereof and being separable from said main box, each of said divider panels having opposite rear and front edges and upper and lower edges which extend between said rear and front edges;

(c) first and second pluralities of positioning elements for receiving and positioning said divider panels in said interior chamber so as to laterally space apart said divider panels from one another in lockable positions in said main box and to partition said interior chamber into a plurality of side-by-side compartments, said first plurality of positioning elements disposed in said interior chamber on either portions of said rear wall or portions of said top and bottom walls of said main box adjacent to said rear wall thereof, said second plurality of positioning elements disposed on portions of said upper and lower edges of said divider panels being spaced from said front and rear edges of said divider panels and on portions of said top and bottom walls of said main box and being spaced from said rear wall and said front peripheral edge of said main box and forwardly from said first plurality of positioning elements, said second plurality of positioning elements including a plurality of spaced apart pairs of slots defined in portions of said top and bottom walls of said main box such that each of said pairs of slots is spaced from said rear wall and said front peripheral edge of said main box and located forwardly from and aligned with a respective one set of said first positioning elements and a plurality of pairs of lock tabs, each of said pairs of lock tabs respectively defined on and protruding in opposite directions from portions of said upper and lower edges of one of said divider panels and spaced from said opposite rear and front edges of said divider panel such that said lock tabs of said one divider panel insert into said one of said pairs of slots on said top and bottom walls of said main box when said divider panel is installed in said locked position in said main box; and (d) a front cover plate separable from said main box and said divider panels, said front cover plate having opposite front and rear sides and attachable to said main box such that said rear side of said front cover plate covers said front opening of said main box and portions of the rear side of the front cover plate are capable of making flush contact with the front edges of the divider panels so as to close off said side-by-side compartments from one another at said front edges of said divider panels when said divider panels are in said locked positions in said main box.

4. The assembly of claim 3 wherein each of said pairs of slots is located closer to said front peripheral edge of said main box than to said rear wall of said main box.

5. The assembly of claim 3 wherein said slots are substantially covered by breakaway tabs detachably attached to said respective top and bottom walls of said main box and capable of detachment therefrom prior to insertion of said respective divider panels in said main box.

6. The assembly of claim 3 wherein each of said pairs of lock tabs is located closer to said front edge of said one of said divider panels than to said rear edge of said one of said divider panels.

7. A multiple gang junction box assembly, comprising:

(a) a main b ox having rear, top, bottom and opposite side walls interconnected so as to form an interior chamber in said main box, said top, bottom and opposite side walls of said main box forming a front peripheral edge on said main box defining a front opening to said interior chamber which is spaced forwardly from and in opposing relationship to said rear wall of said main box;

(b) a plurality of divider panels insertable into and removable from said interior chamber of said main box through said front opening thereof and being separable from said main box, each of said divider panels having opposite rear and front edges and upper and lower edges which extend between said rear and front edges;

(c) first and second pluralities of positioning elements for receiving and positioning said divider panels in said interior chamber so as to laterally space apart said divider panels from one another in lockable positions in said main box and to partition said interior chamber into a plurality of side-by-side compartments, said first plurality of positioning elements disposed in said interior chamber and including laterally spaced apart sets of upper and lower pairs of spaced apart ledges attached on and extending along either portions of said rear wall or portions of said top and bottom walls of said main box adjacent to said rear wall thereof and projecting into said interior chamber of said main box and extending toward and ending at a location spaced rearwardly from said front peripheral edge of said main box such that upper and lower pairs of ledges of each set define channels therebetween being aligned with one another so as to removably receive in said aligned channels segments of said rear edge or segments of said upper and lower edges of one of said divider panels when said divider panel is installed in a locked position in said main box, said second plurality of positioning elements including a plurality of spaced apart pairs of slots defined in portions of said top and bottom walls of said main box such that each of said pairs of slots is spaced from said rear wall and said front peripheral edge of said main box and located forwardly from and aligned with said channels of one of said sets of said upper and lower pairs of ledges, and a plurality of pairs of lock tabs with each of said pairs of lock tabs respectively defined on and protruding in opposite directions from portions of said upper and lower edges of one of said divider panels and being spaced from said opposite rear and front edges of said divider panel such that said lock tabs of said one divider panel insert into one of said pairs of slots on said top and bottom walls of said main box when said divider panel is installed in said locked position in said main box; and (d) a front cover plate separable from said main box and said divider panels, said front cover plate having opposite front and rear sides and attachable to said main box such that said rear side of said front cover plate covers said front opening of said main box and portions of said rear side of said front cover plate are capable of making flush contact with said front edges of said divider panels so as to close off said side-by-side compartments from one another at said front edge portions of said divider panels when said divider panels are in said locked positions in said main box.

8. The assembly of claim 7 wherein each of said pairs of slots is located closer to said front peripheral edge of said main box than to said rear wall of said main box.

9. The assembly of claim 7 wherein said slots are substantially covered by breakaway tabs detachably attached to said respective top and bottom walls of said main box and capable of detachment therefrom prior to insertion of said respective divider panels in said main box.

10. The assembly of claim 7 wherein each of said pairs of lock tabs is located closer to said front edge of said one of said divider panels than to said rear edge of said one of said divider panels.

11. The assembly of claim 7 wherein said main box, divider panels and front cover plate are made of plastic material.

* * * * *